US012760706B2

(12) United States Patent
Siniscalchi Minna et al.

(10) Patent No.: US 12,760,706 B2
(45) Date of Patent: Oct. 13, 2026

(54) WIND TURBINE CONTROL TO MAXIMISE POWER PRODUCTION WITH A THRUST LIMIT

(71) Applicant: VESTAS WIND SYSTEMS A/S, Aarhus (DK)

(72) Inventors: Sara Siniscalchi Minna, Aarhus (DK); Jesper Sandberg Thomsen, Hadsten (DK); Alexander Duncan Giles, Oporto (PT); Anders Druedahl Thurlow, Silkeborg (DK)

(73) Assignee: VESTAS WIND SYSTEMS A/S, Aarhus N (DK)

(*) Notice: Subject to any disclaimer, the term of this patent is extended or adjusted under 35 U.S.C. 154(b) by 0 days.

(21) Appl. No.: 18/878,752

(22) PCT Filed: Jun. 27, 2023

(86) PCT No.: PCT/DK2023/050168
§ 371 (c)(1),
(2) Date: Dec. 24, 2024

(87) PCT Pub. No.: WO2024/002446
PCT Pub. Date: Jan. 4, 2024

(65) Prior Publication Data

US 2025/0382942 A1 Dec. 18, 2025

(30) Foreign Application Priority Data

Jun. 27, 2022 (DK) ............................. PA202270341

(51) Int. Cl.
*F03D 7/04* (2006.01)
*F03D 7/02* (2006.01)

(52) U.S. Cl.
CPC ........... *F03D 7/046* (2013.01); *F03D 7/0224* (2013.01); *F03D 7/0276* (2013.01); *F03D 7/028* (2013.01);
(Continued)

(58) Field of Classification Search
CPC ...... F03D 7/046; F03D 7/0224; F03D 7/0276; F03D 7/028; F05B 2270/1031;
(Continued)

(56) References Cited

U.S. PATENT DOCUMENTS 8,803,352 B1 * 8/2014 Koerber ................ F03D 7/0276 290/55
2011/0309621 A1 12/2011 Nielsen et al.
2018/0347543 A1 12/2018 Vadlamudi et al.

FOREIGN PATENT DOCUMENTS

EP 2829724 A1 1/2015
EP 2886854 A1 6/2015
(Continued)

OTHER PUBLICATIONS

Danish Patent and Trademark Office, 1st Technical Examination including the Search Report and Search Opinion for Application PA 2022 70341 dated Jan. 24, 2023 (Jan. 24, 2023).
(Continued)

*Primary Examiner* — Joseph Ortega
(74) *Attorney, Agent, or Firm* — Patterson + Sheridan, LLP; Gero G. McClellan

(57) ABSTRACT

The invention relates to controlling a wind turbine. A predefined power coefficient data structure and a predefined thrust coefficient data structure respectively comprise values of a power coefficient and a thrust coefficient as functions of blade pitch angle and tip speed ratio. The invention includes using an iterative search algorithm to determine values of pitch angle and tip speed ratio that maximise the power
(Continued)

coefficient value in the predefined power coefficient data structure subject to a constraint that the thrust coefficient value in the predefined thrust coefficient data structure is no greater than a maximum threshold thrust coefficient value. A rotor speed reference is determined based on the determined tip speed ratio value and on a received wind speed. The determined pitch angle value is set as a pitch angle reference. The wind turbine is controlled in accordance with the pitch angle and tip speed ration references.

20 Claims, 5 Drawing Sheets

(52) U.S. Cl.
CPC ................. *F05B 2270/1031* (2013.01); *F05B 2270/1033* (2013.01); *F05B 2270/32* (2013.01); *F05B 2270/329* (2013.01)

(58) Field of Classification Search
CPC .......... F05B 2270/1033; F05B 2270/32; F05B 2270/329
See application file for complete search history.

(56) References Cited

FOREIGN PATENT DOCUMENTS

| | | | |
|---|---|---|---|
| EP | 2933477 | A1 | 10/2015 |
| EP | 3056726 | A1 | 8/2016 |
| EP | 3088733 | A1 | 11/2016 |
| EP | 3754179 | A1 | 12/2020 |
| EP | 3812578 | A1 | 4/2021 |
| EP | 4227523 | A1 | 8/2023 |
| WO | 2018222371 | A1 | 12/2018 |

OTHER PUBLICATIONS

PCT International Search Report and Written Opinion of the International Searching Authority for Application PCT/DK2023/050168 dated Sep. 28, 2023 (Sep. 28, 2023).

* cited by examiner

WIND TURBINE CONTROL TO MAXIMISE POWER PRODUCTION WITH A THRUST LIMIT

TECHNICAL FIELD

The invention relates to controlling a wind turbine having a rotor and a plurality of pitch-adjustable rotor blades. In particular, the invention relates to controlling the wind turbine to maximise its power production while limiting rotor thrust with respect to a thrust limit.

BACKGROUND

Wind power has become a popular alternative for producing electricity in the shift to renewable energy to replace the use of fossil fuels. Wind power plants consist of wind turbines which collectively generate power to be delivered to the grid. The architecture of a wind turbine typically includes a tower that supports a nacelle and a rotor with three pitch-adjustable rotor blades that are mounted to the rotor. The blades and the rotor enable the wind turbine to deliver power to the grid by converting the kinetic energy from incoming wind into electrical energy to be delivered to the grid.

The power produced by a wind turbine depends on the availability of the wind in the vicinity of the wind turbine, and it is generally desirable to operate a wind turbine in such a manner that the electrical power generated from the wind turbine is maximised. This may be measured by referring to an AEP (annual energy production) of a wind turbine or wind power plant, which is the total amount of electrical energy that the wind power plant produces in the space of a year, e.g. in kilowatt or megawatt hours.

In practical terms, the power generated from a wind turbine can be optimised or maximised by controlling one or more components of the wind turbine, e.g. the pitch of pitch-adjustable rotor blades or the rotational speed of the rotor. However, in certain conditions, a wind turbine may experience high aerodynamic forces that result in high thrust loads and blade deflections due to the interaction between the incoming wind flow and the wind turbine. Continual operation of a wind turbine without mitigating such thrust loads may result in component fatigue and may reduce the ability of the wind turbine to generate electricity at its rated power. Therefore, to protect the wind turbines from such thrust loads, wind turbines are typically operated in a manner that balances maximising the power output while limiting the thrust loads on the wind turbine.

European Patent Publication No. EP2582973B1 discloses a control method that enforces a minimum pitch angle to limit the thrust on the rotor blades to below a certain thrust reference. The thrust reference may vary and, in particular, may be determined based on a turbulence level of the incoming wind. As the thrust reference decreases, control of the wind turbine to limit the thrust level needs to increase or become more active, ensuring that the negative impact on AEP is minimum.

It is against this background to which the present invention is set.

SUMMARY OF THE INVENTION

According to an aspect of the present invention there is provided a method of controlling a wind turbine having a rotor and a plurality of pitch-adjustable rotor blades mounted to the rotor. The method comprises receiving wind speed data indicative of wind speed in the vicinity of the wind turbine. The method comprises retrieving a predefined power coefficient data structure comprising values of a power coefficient as a function of a pitch angle of the rotor blades and of a tip speed ratio of the wind turbine. The method comprises retrieving a predefined thrust coefficient data structure comprising values of a thrust coefficient as a function of the pitch angle of the rotor blades and of the tip speed ratio of the wind turbine. The method comprises determining a value of the pitch angle and a value of the tip speed ratio that maximises the power coefficient value in the predefined power coefficient data structure subject to a defined set of constraints. The set includes a constraint that the thrust coefficient value in the predefined thrust coefficient data structure is no greater than a maximum threshold thrust coefficient value. The method includes determining a rotor speed reference based on the determined tip speed ratio value and on the received wind speed data. The method includes setting the determined pitch angle value as a pitch angle reference. The method includes controlling the wind turbine in accordance with the rotor speed reference and the pitch angle reference. Determining the pitch angle and tip speed ratio values comprises applying an iterative search algorithm to the predefined power coefficient data structure to maximise the power coefficient value subject to the defined set of constraints.

Applying the iterative search algorithm may comprise:

- defining an initial evaluation point comprising an initial pitch angle value and an initial tip speed ratio value;
- determining a step size for each of the pitch angle and the tip speed ratio;
- determining an updated evaluation point comprising updated pitch angle and tip speed ratio values by shifting the initial pitch angle and tip speed ratio values by the respective step sizes; and,
- evaluating the power coefficient value at the updated evaluation point.

The iterative search algorithm may comprise determining a difference between a maximum value of the power coefficient in the power coefficient data structure and the power coefficient value at the updated evaluation point. If the determined difference is less than a prescribed threshold difference value then the updated pitch angle and tip speed ratio values may be determined to be the pitch angle and tip speed ratio values that maximise the power coefficient value.

If the determined difference is greater than the prescribed threshold difference value then the iterative search algorithm may comprise:

- determining a further step size for each of the pitch angle and the tip speed ratio;
- determining a further updated evaluation point comprising further updated pitch angle and tip speed ratio values by shifting the updated pitch angle and tip speed ratio values by the respective further step sizes; and,
- evaluating the power coefficient value at the further updated evaluation point.

The method may comprise repeating the steps of determining the further step size, determining the further updated evaluation point, and evaluating the power coefficient value, until a stop condition is satisfied.

The stop condition may be that one of the following is satisfied: a determined difference between a maximum value of the power coefficient in the power coefficient data structure and the power coefficient value at the further updated evaluation point is less than the prescribed threshold difference value; and, the steps have been repeated a prescribed number of iterations.

The iterative search algorithm may include a gradient-based step method. The step size for pitch angle may be determined based on a determined gradient of the thrust coefficient at the updated (or initial) pitch angle value in the thrust coefficient data structure. The step size for tip speed ratio may be determined based on a determined gradient of the thrust coefficient at the updated (or initial) tip speed ratio value in the thrust coefficient data structure.

The further updated evaluation point $x_{i+1}=[\theta_{i+1}, \lambda_{i+1}]$ may be determined as:

$$x_{i+1} = x_i - \alpha(x_i)\frac{\nabla C_t(x_i)}{\|\nabla C_t(x_i)\|} \quad i = 0, \ldots, N-1$$

$$\alpha(x_i) = [\theta_{max} - \theta_i, \lambda_{max} - \lambda_i]$$

where $x_i=[\theta_i, \lambda_i]$ is the updated evaluation point, $\theta_i$ is the updated pitch angle value, $\lambda_i$ is the further tip speed ratio value, $\theta_{i+1}$ is the further updated pitch angle value, $\lambda_{i+1}$ is the further updated tip speed ratio value, $(\theta_{max}, \lambda_{max})$ is the pair of pitch angle and tip speed ratio values that maximises the power coefficient in the power coefficient data structure, N is the prescribed maximum number of iterations, and $\nabla C_t(x_i)$ is the gradient of the thrust coefficient at the updated evaluation point.

The iterative search algorithm may include a one-step descent method. The step size for pitch angle may be determined as the difference between the pitch angle value that maximises the power coefficient value and the initial pitch angle value. The step size for tip speed ratio may be determined as the difference between the tip speed ratio value that maximises the power coefficient value and the initial tip speed ratio value.

Implementing the thrust coefficient value constraint may comprise reducing a feasible solution space of the power coefficient data structure for the iterative search algorithm to remove combinations of pitch angle and tip speed ratio values corresponding to values of the thrust coefficient greater than the maximum threshold thrust coefficient value in the thrust coefficient data structure.

The defined set of constraints may include a constraint that the maximum threshold thrust coefficient value $C_{t,max}$ satisfies:

$$C_{t,max} = F_{t,max} \Big/ \frac{\rho_{air}}{2} A_{rot} V^2$$

where $F_{t,max}$ is a maximum allowable rotor thrust, $A_{rot}$ is a swept area of the rotor blades of the wind turbine, $\rho_{air}$ is air density, and V is the wind speed.

The defined set of constraints may include a constraint that a generator speed of a generator of the wind turbine is no greater than a maximum threshold generator speed value. The maximum threshold generator speed value may be determined based on the received wind speed data or generator component limitations.

The defined set of constraints may include a constraint that the determined pitch angle and tip speed ratio values do not cause one or both of: a stall condition of the wind turbine; and, instability of the rotor blades of the wind turbine.

The method may comprise:

receiving blade load data indicative of loading experienced by the rotor blades from one or more blade load sensors of the wind turbine;

determining, based on the received blade load data, a statistical dispersion parameter indicative of temporal variation in the blade loading; and, defining the maximum threshold thrust level based on the determined statistical dispersion parameter.

According to another aspect of the invention there is provided a non-transitory, computer-readable storage medium storing instructions thereon that when executed by one or more processors cause the one or more processors to execute the method defined above.

According to another aspect of the present invention there is provided a controller for a wind turbine having a rotor and a plurality of pitch-adjustable rotor blades mounted to the rotor. The controller is configured to receive wind speed data indicative of wind speed in the vicinity of the wind turbine. The controller is configured to retrieve a predefined power coefficient data structure comprising values of a power coefficient as a function of a pitch angle of the rotor blades and of a tip speed ratio of the wind turbine. The controller is configured to retrieve a predefined thrust coefficient data structure comprising values of a thrust coefficient as a function of the pitch angle of the rotor blades and of the tip speed ratio of the wind turbine. The controller is configured to determine a value of the pitch angle and a value of the tip speed ratio that maximises the power coefficient value in the predefined power coefficient data structure subject to a defined set of constraints. The set includes that the thrust coefficient value in the predefined thrust coefficient data structure is no greater than a maximum threshold thrust value. The controller is configured to determine a rotor speed reference based on the determined tip speed ratio value and on the received wind speed data. The controller is configured to set a pitch angle reference based on the determined pitch angle value. The controller is configured to output a control signal to control the wind turbine in accordance with the rotor speed reference and the pitch angle reference. Determining the pitch angle and tip speed ratio values comprises applying an iterative search algorithm to the predefined power coefficient data structure to maximise the power coefficient value subject to the defined set of constraints.

According to another aspect of the present invention there is provided a wind turbine comprising a controller as defined above.

BRIEF DESCRIPTION OF THE DRAWINGS

Examples of the invention will now be described with reference to the accompanying drawings, in which.

DETAILED DESCRIPTION

Figure 1:
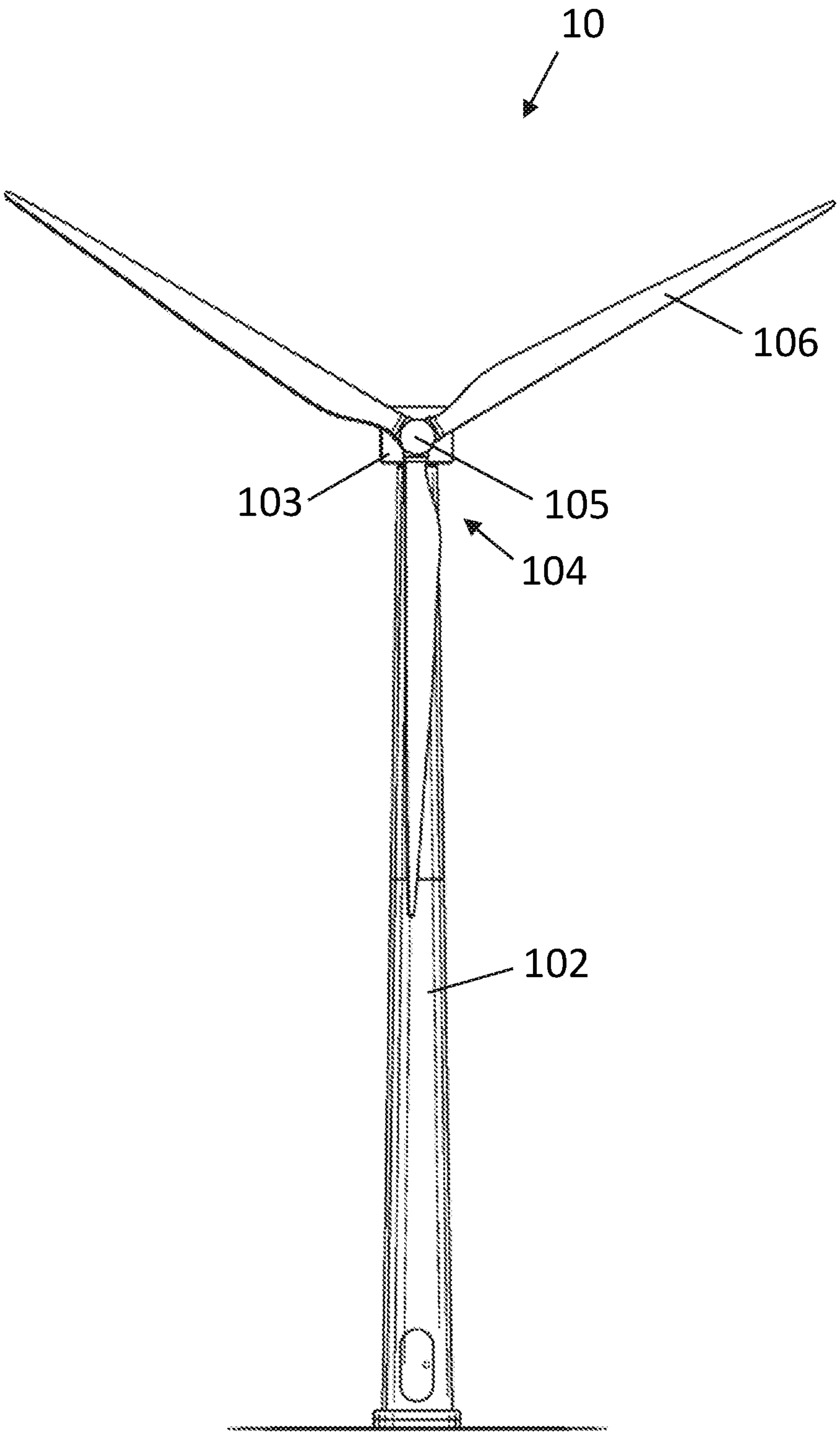
FIG. 1 schematically illustrates a wind turbine in accordance with an aspect of the invention, the wind turbine including a rotor and a plurality of pitch-adjustable rotor blades.

FIG. 1 illustrates, in a schematic view, an example of a wind turbine 10. The wind turbine 10 includes a tower 102, a nacelle 103 disposed at the apex of, or atop, the tower 102, and a rotor 104 operatively coupled to a generator housed inside the nacelle 103. In addition to the generator, the nacelle 103 houses other components required for converting wind energy into electrical energy and various components needed to operate, control, and optimise the performance of the wind turbine 10. The rotor 104 of the wind turbine 10 includes a central hub 105 and three rotor blades 106 that project outwardly from the central hub 105. In the figure three blades are shown; however, a greater or fewer number of blades can also be used in different examples. Moreover, the wind turbine 10 comprises a control system or controller (not shown in FIG. 1). The controller may be placed inside the nacelle 103, in the tower 102 or distributed at a number of locations inside (or externally to) the turbine 10 and communicatively connected to one another.

The rotor blades 106 are pitch-adjustable. The rotor blades 106 can be adjusted in accordance with a collective pitch setting, where each of the blades are set to the same pitch value. In some examples, the rotor blades 106 may be adjustable in accordance with individual pitch settings, where each blade 106 may be provided with an individual pitch setpoint.

One or more sensors or measuring units may be provided with the hub section 105, in or on the nacelle 103, in one or more of the blades 106, and/or in the tower 102. Such sensors may be arranged to measure one or more operational parameters representing a loading on the wind turbine rotor 104 exerted by the wind, such as an acceleration of a component of the wind turbine 10, a load of a component of the wind turbine 10, a deflection of a component of the wind turbine 10, or a rotational speed of a component of the wind turbine 10. The load measurement may for instance be a torque measurement at the hub 105 or a stress in a root 109 of the blades 106. This may be performed by any suitable means, such as strain gauges, optical fibres, etc. An acceleration measurement may be performed by an accelerometer arranged within the hub 105, the nacelle 103, tower top, or on a main shaft of the wind turbine 10. A deflection measurement may be performed e.g. by an angle measurement device. A rotations per minute (rpm) measurement may conveniently be performed on the main shaft of the turbine 10 or on a rotatable part within the hub section 105, to measure the rotational speed of the rotor 104. Alternatively, it may be performed by an instrument, which is independent of access to the main shaft of the wind turbine 10.

Wind flowing past the wind turbine 10 drives rotational motion of the rotor blades 106, which causes rotation of the rotor 104. The interaction between the incoming wind flow and the wind turbine rotor 104 results in a thrust force that can generate blade loads and blade deflections, and fore-aft and side-side bending moments of the wind turbine tower 102.

The aerodynamic force generated by the interaction of the wind with the rotor blades 106 (and other wind turbine components) may be expressed as $$F_t = \frac{\rho_{air}}{2} A_{rot} V^2 C_t(\theta, \lambda)$$

where V is the wind speed, $A_{rot}$ is a swept area of the rotor blades 106, $\rho_{air}$ is the air density, and $C_t$ is the thrust coefficient. The thrust coefficient $C_t$ is a dimensionless parameter describing an axial force exerted by the wind turbine 10 to the incoming momentum of the wind flow. The thrust coefficient $C_t$ is a function of tip speed-ratio (TSR) $\lambda$ and pitch angle $\theta$ of the rotor blades 106. The TSR $\lambda$ is a ratio between the wind speed and the speed of the tips of the wind turbine blades 106 as they rotate about the rotor axis.

It is known to control a wind turbine to limit aerodynamic or thrust force loads experienced by the wind turbine. This is to protect one or more components of the wind turbine, e.g. the rotor blades, from high loading that may result in fatigue/damage of the components in a manner that reduces component lifespan or reduces the amount of power the wind turbine is capable of producing.

One known method for limiting the thrust loading is to set or determine a maximum threshold limit or reference value for the thrust coefficient, and then control the wind turbine such that the thrust coefficient value does not exceed the maximum thrust limit value during wind turbine operation. In particular, in known methods this is achieved by controlling the pitch angle $\theta$ of the rotor blades 106—by setting a pitch angle reference—to be no less than a defined minimum pitch angle $\theta_{min}$.

A thrust limit value may vary during operation of a wind turbine (a 'dynamic thrust limit'). In particular, a thrust limit may be determined based on a level of turbulence of wind in the vicinity of the wind turbine. In turn, the turbulence level may be determined based on the loading experienced by the rotor blades (e.g. as measured using blade load sensors), in particular how the loading varies over time. Specifically, the turbulence level may be determined based on a determined statistical dispersion parameter—such as standard deviation—indicative of temporal variation in the blade loading.

Therefore, the turbulence level may be determined and then a minimum pitch angle $\theta_{min}$ may be set, e.g. via a lookup table, and enforced via blade pitch control to guarantee that the thrust loads do not exceed the thrust limit, i.e. by controlling pitch angle of the rotor blades in accordance with a pitch angle reference that is no less than the minimum pitch angle $\theta_{min}$. While this may protect the wind turbine from excessive loading, such a control routine may not be optimal for power production.

The present invention is advantageous in that it provides a wind turbine method and controller that not only protects a wind turbine from excessive thrust loading, but also maximises power production within these loading constraints. The invention achieves this by setting both: a pitch angle reference; and, a rotor speed reference. That is, both the pitch angle of the rotor blades and the speed of the wind turbine rotor are controlled, in particular in a manner that maximises power production while preserving the wind turbine from experiencing excessive thrust loading. Specifically, the invention is advantageous in that it determines optimised values of pitch angle and tip speed ratio to achieve the above aims in a fast and efficient manner. This is achieved via the use of an iterative search algorithm to determine the optimised (pair of) values in a defined data structure that includes values indicative of wind turbine power production for different combinations of pitch angle and tip speed ratio. This will be described in greater detail below.

Figure 2:
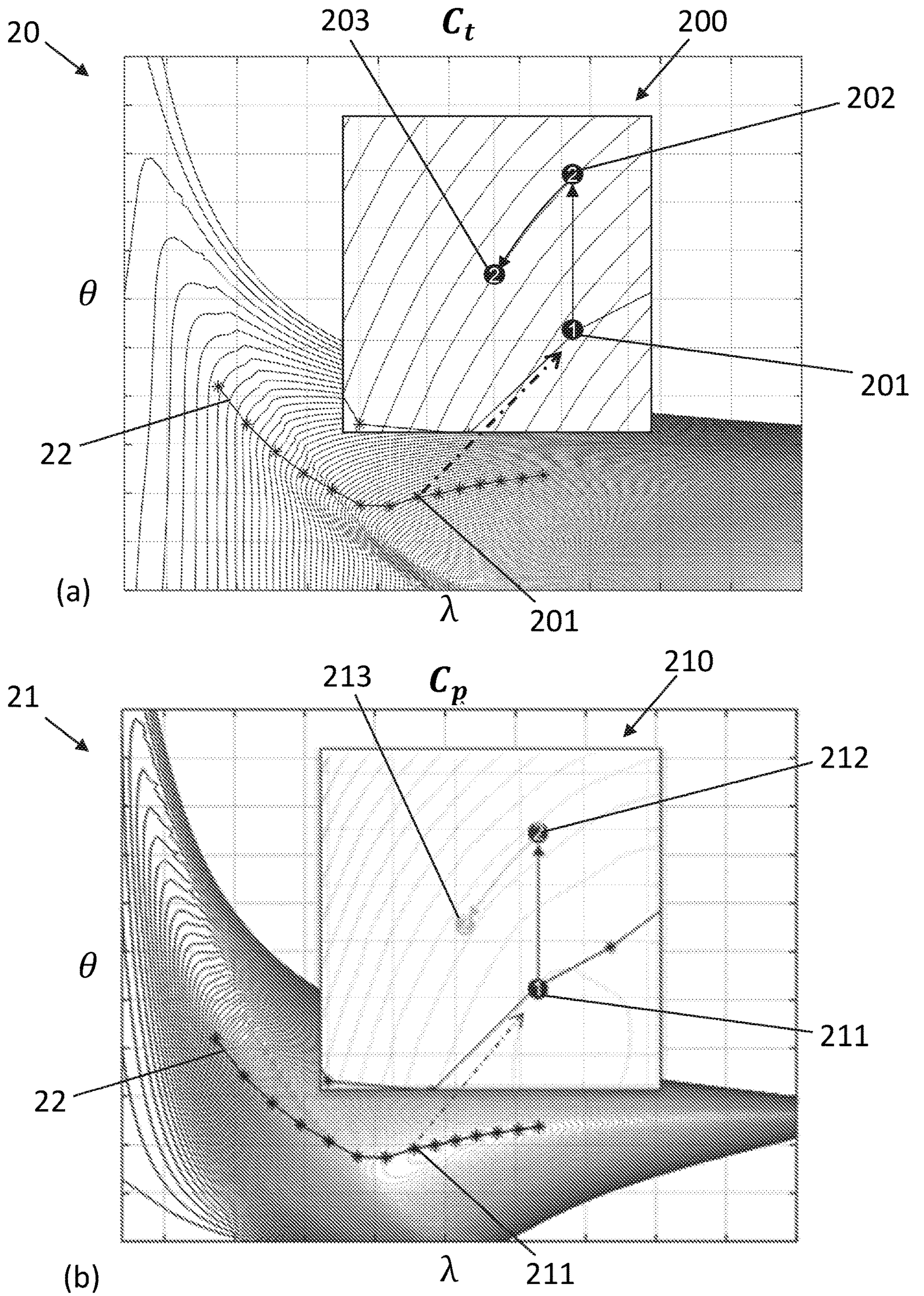
FIG. 2 shows tables indicating parameter values as a function of pitch angle of the rotor blades of FIG. 1 and a tip speed ratio of the wind turbine of FIG. 1; in particular, in FIG. 2(*a*) the parameter is a thrust coefficient, and in FIG. 2(*b*) the parameter is a power coefficient.

FIG. 2 shows data structures 20, 21 indicating parameter values as a function of pitch angle θ of the rotor blades 106 and of a tip speed ratio λ of the wind turbine 10. In particular, FIG. 2(*a*) is a table or two-dimensional map 20 that indicates or provides values of the thrust coefficient $C_t$ for different combinations or pairs of pitch angle θ and TSR λ values. FIG. 2(*b*) is a table or two-dimensional map 21 that indicates or provides values of a power coefficient $C_p$ for different combinations or pairs of pitch angle θ and TSR λ values. The power coefficient is a dimensionless parameter that is used to provide an indication of wind turbine efficiency. In particular, the power coefficient $C_p$ is a ratio of actual electric power produced by the wind turbine 10 divided by a total wind power flowing into the wind turbine 10 at specific wind speed.

Each of the data structures 20, 21 are predefined in the sense that the values of $C_t$ and $C_p$ for different combinations of θ and λ are known a priori. This data may be ascertained in any suitable manner, e.g. via experimentation, simulation, field testing, etc. The data structures 20, 21 may be stored in a data memory or other location accessible by the controller of the wind turbine 10.

Each of the data structures 20, 21 show an optimal pitch-TSR curve 22 In one sense, this can be regarded as indicating the values of pitch angle θ that maximise the $C_p$ value for different values of TSR λ, ensuring the turbine operates far from stall conditions.

Consider a scenario in which there is no maximum limit placed on the thrust loading of the wind turbine 10. In order to maximise power production for a given wind speed in the vicinity of the wind turbine 10, it is simply required to obtain the point in FIG. 2(*b*) that maximises the $C_p$ value. Such a point 211 is indicated in the map 21, and is also shown in the zoomed area 210 of the map 21 that overlays the map 21 in FIG. 2(*b*). The 'optimised' point 211 corresponds to a specific, 'optimised' pitch angle θ value and specific, 'optimised', TSR λ value. To maximise power production, therefore, the wind turbine 10 may be operated in accordance with a pitch angle reference that is based on the optimised θ value and a rotor speed reference that is based on the optimised λ value (and may be determined using the wind speed).

Turning to FIG. 2(*a*), the optimised θ and λ values correspond to a specific value of the thrust coefficient $C_t$, as indicated by the point 201 in the map 20, and is also shown in the zoomed area 200 of the map 20 that overlays the map 20 in FIG. 2(*a*). In this example, this particular pair of θ and λ values correspond to a relatively high thrust coefficient $C_t$, meaning that the thrust loading on the wind turbine 10 may be relatively high.

As mentioned above, it may be desired to limit the thrust loading experienced by the wind turbine so as to protect the wind turbine from component fatigue, etc. In one known method (as outlined above), this is achieved by adjusting the pitch angle reference so that the thrust coefficient $C_t$ does not exceed a threshold value. With reference again to FIG. 2(*a*), this may be achieved by adjusting θ (and so moving away from the optimal pitch-TSR curve 22) until a suitable value of $C_t$ is reached in the map 20, i.e. a value of $C_t$ below the defined threshold value. In the illustrated example, such a point 202 is indicated in the zoomed area 200 of the map 20. The wind turbine may then be controlled in accordance with a pitch angle reference based on the θ value of the point 202.

While such wind turbine control may reduce thrust loading on the wind turbine rotor, it also results in an undesirable reduction of power production of the wind turbine. With reference again to FIG. 2(*b*), the θ and λ values corresponding to point 202 in FIG. 2(*a*)—as indicated by point 212 in the zoomed area 210 of the map 21—correspond to a lower $C_p$ value than the point 211 (where no limit on thrust loading is enforced).

The invention provides a method for adjusting both θ and λ values (rather than just the θ value) so as to maximise the $C_p$ value while adhering to one or more constraints including a constraint that the thrust coefficient $C_t$ does not exceed a threshold value. In the example illustrated in FIGS. 2(*a*) and 2(*b*), it is shown that such a pair of θ and λ values exist, corresponding to points 203 and 213 in FIGS. 2(*a*) and 2(*b*), respectively. In particular, it may be seen in FIG. 2(*a*) that the point 203 has the same $C_t$ value (below the threshold value) as the point 202 (where only θ was adjusted), but that the point 213 in FIG. 2(*b*) has a higher $C_p$ value than the point 212 (where only θ was adjusted). The wind turbine 10 may then be controlled in accordance with a pitch angle reference based on the θ value of the point 203, 213, and a rotor speed reference based on the λ value of the point 203, 213 (and the wind speed), thereby increasing power production while still protecting the wind turbine from excessive thrust loading.

An issue is that determining the values of θ and λ that maximise $C_p$ while adhering to the thrust loading constraints can be a complex problem. In the described example, the problem to be solved may be framed as a minimisation problem, in particular to minimise a function $f$ as follows:

$$\text{minimise } f(\lambda, \theta) = -C_p(\lambda, \theta)$$

where λ, θ∈ $\mathbb{R}$ .

The optimisation problem is to be solved subject to a number of constraints. In the described example, the following constraints are to be imposed:

$$[\lambda, \theta] \in \Omega_0,\ \Omega_0 := \Omega \backslash \Omega_{STALL}$$

$$C_t \le C_{t,max}$$

$$C_{t,max} = F_{t,max} \Big/ \frac{\rho_{air}}{2} A_{rot} V^2$$

$$\omega \le \omega_{max}(V)$$

With $C_t$ and $C_p$ being nonlinear functions of TSR and pitch angle (as illustrated in FIGS. 2(*a*) and 2(*b*)), the problem presents a nonlinear objective function and a set of nonlinear constraints.

The first constraint stated above is included to avoid stall conditions and blade instabilities, meaning that the TSR and pitch angle that are determined to optimise $C_p$ need to be found in a subset $\Omega_0$ that is obtained by removing the stall region $\Omega_{STALL}$ below the optimal pitch-TSR-curve 22 from the domain of all possible solutions Ω, e.g. the entirety of the map 21. The second and third constraints stated above ensure that the thrust is kept below a defined maximum value ($F_{t,max}$) function of the blade loads and operating conditions. The last constraint stated above is included to ensure that the generator speed ω does not exceed a maximum generator speed value $\omega_{max}$, which is a function of the wind speed V. This constraint may allow a small overspeed if it is beneficial for power production, i.e. AEP, e.g. around rated wind speed.

Figure 3:
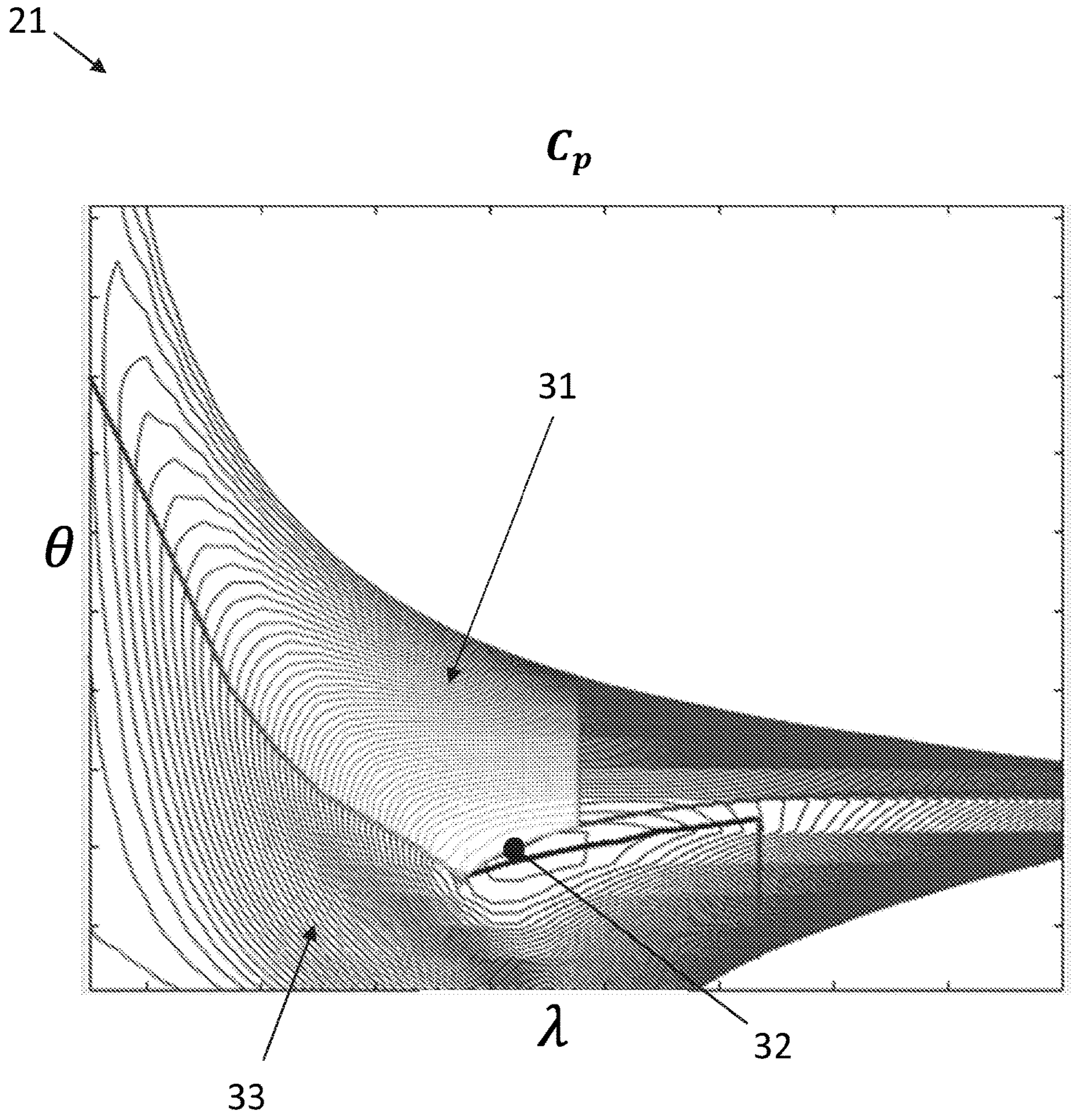
FIG. 3 shows the power coefficient table of FIG. 2(*b*) and indicates a pair of pitch angle and tip speed ratio values that maximises the power coefficient in a defined feasible region of the table.

When the defined constraints are implemented, a region or area of feasible solutions may be identified in the $C_p$ map/table 21. FIG. 3 shows the $C_p$ table 21 of FIG. 2(*b*), but with the feasible region 31 indicated. The solution to the optimisation problem will provide a pair of pitch angle and TSR values that maximise the $C_p$ value (in the feasible region) with the least impact on thrust loads. It is noted that, although the point(s) corresponding to the maximum $C_p$ value in the entire table 21 will remain the same, the point that maximises the $C_p$ value will change as the constraints change (as the feasible region 31 will change). The optimised solution in the example illustrated in FIG. 3 is indicated as the point 32. The region 33 of unfeasible solutions for the particular set of constraints in the illustrated example is also indicated in FIG. 3.

However, as mentioned above, solving the above nonlinear optimisation problem subject to the nonlinear constraints to determine the optimised point 32 is a complex problem. In some examples, the complexity is added to where a dynamic thrust limit is enforced. That is, the thrust limit may be different each time the optimisation problem is to be solved. As described above, the thrust limit may be determined based on the prevailing wind conditions, e.g. a level of turbulence of the wind in the vicinity of the wind turbine 10.

The invention beneficially makes use of one or more iterative search algorithms to solve the optimisation problem subject to the defined constraints to obtain the optimised pair of pitch angle and TSR values. The particular iterative search algorithm(s) to be used has/have high-speed convergence to the solution at relatively low computational cost. This is beneficial in the context of operating a wind turbine in real time, with computations/determinations being performed on-site at the wind turbine or wind farm by one or more controllers/control systems having limited processing power or capacity. That is, the approach of the present invention provides a practical way to efficiently solve the optimisation problem online.

An iterative search algorithm that is to be used to solve the optimisation problem may be provided with an initial or reference point or vector $x_0 \in \mathbb{R}^2$, $x_0=[\lambda_0, \theta_0]$, where $\lambda_0$ is the initial TSR value and $\theta_0$ is the initial pitch angle. The initial values $\lambda_0$, $\theta_0$ may be current values of the TSR and pitch angle as the wind turbine 10 operates. For instance, the initial TSR may be determined using measured, estimated, or otherwise obtained values for (current) wind speed and rotor speed. Similarly, the initial pitch angle may be obtained via a measurement of the collective pitch setting of the rotor blades 106.

An iterative procedure may then be implemented to find another point which is feasible, and which corresponds an improvement in the objective function. This continues until no further improvement in the objective function is possible.

The iterative search algorithm may be selected or designed such that the step size between points in successive iterations may be chosen. One such algorithm or method may be referred to as a one-step method. In this algorithm, a step size may be formulated or set as a difference between the input measurements of TSR and pitch angle (i.e. the initial or reference values) and the corresponding values for which the $C_p$ value is maximised (in the map/table 21). Hence, an updated or new evaluation point $x_N$ may be expressed as $$x_N = x_{N-1} + \alpha(x_{N-1})$$

$$\alpha(x_{N-1}) = [\lambda_{max} - \lambda_{N-1}, \theta_{max} - \theta_{N-1}]$$

where $x_{N-1}$ is the previous (initial) evaluation point, $\alpha$ is the step size, $(\lambda_{max}, \theta_{max})$ is the pair of TSR and pitch angle values that maximises the $C_p$ value, and $(\lambda_{N-1}, \theta_{N-1})$ is the pair of initial or previous TSR and pitch angle values.

It will be apparent that, using this one-step approach, the optimised TSR and pitch angle values should be obtained after the first iteration. This method is extremely simple and is fast to reach convergence to maximise the $C_p$ value, which is important in the present context as explained above.

Another iterative search algorithm that may be used is a gradient-based approach. In this approach, it is ensured that the step towards the optimum $C_p$ value is defined as a function of the gradient of the $C_t$ value. This is with respect to pitch angle and TSR for moving in directions where the impact on $C_t$ value is minimum and the change in pitch angle and TSR values between evaluation points is sufficiently low to avoid jumps that may cause load instabilities.

At each iteration of such a gradient-based approach, information is obtained at a particular point in solution space to determine the direction defined according to the gradient of $C_t$. The next evaluation point $x_{i+1}=[\theta_{i+1}, \lambda_{i+1}]$ may be expressed as:

$$x_{i+1} = x_i - \alpha(x_i)\frac{\nabla C_t(x_i)}{\|\nabla C_t(x_i)\|} \quad i = 0, \ldots, N-1$$

$$\alpha(x_i) = [\theta_{max} - \theta_i, \lambda_{max} - \lambda_i]$$

where $x_i=[\theta_i, \lambda_i]$ is the previous evaluation point, $\theta_i$ is the previous pitch angle value, $\lambda_i$ is the previous TSR value, $\theta_{i+1}$ is the next pitch angle value, $\lambda_{i+1}$ is the next TSR value, $(\theta_{max}, \lambda_{max})$ is the pair of pitch angle and tip speed ratio values that maximises the $C_p$ value in the $C_p$ data structure 21, N is the prescribed number of iterations, and $\nabla C_t(x_i)$ is the gradient of the thrust coefficient at the previous evaluation point.

The gradient-based approach may be regarded as being beneficial in that it maximises the $C_p$ value while limiting the change (between successive iterations) of the $C_t$ value, thereby guarding against the risk of jumps in the thrust force. This is also done in a computationally efficient manner.

Figure 4:
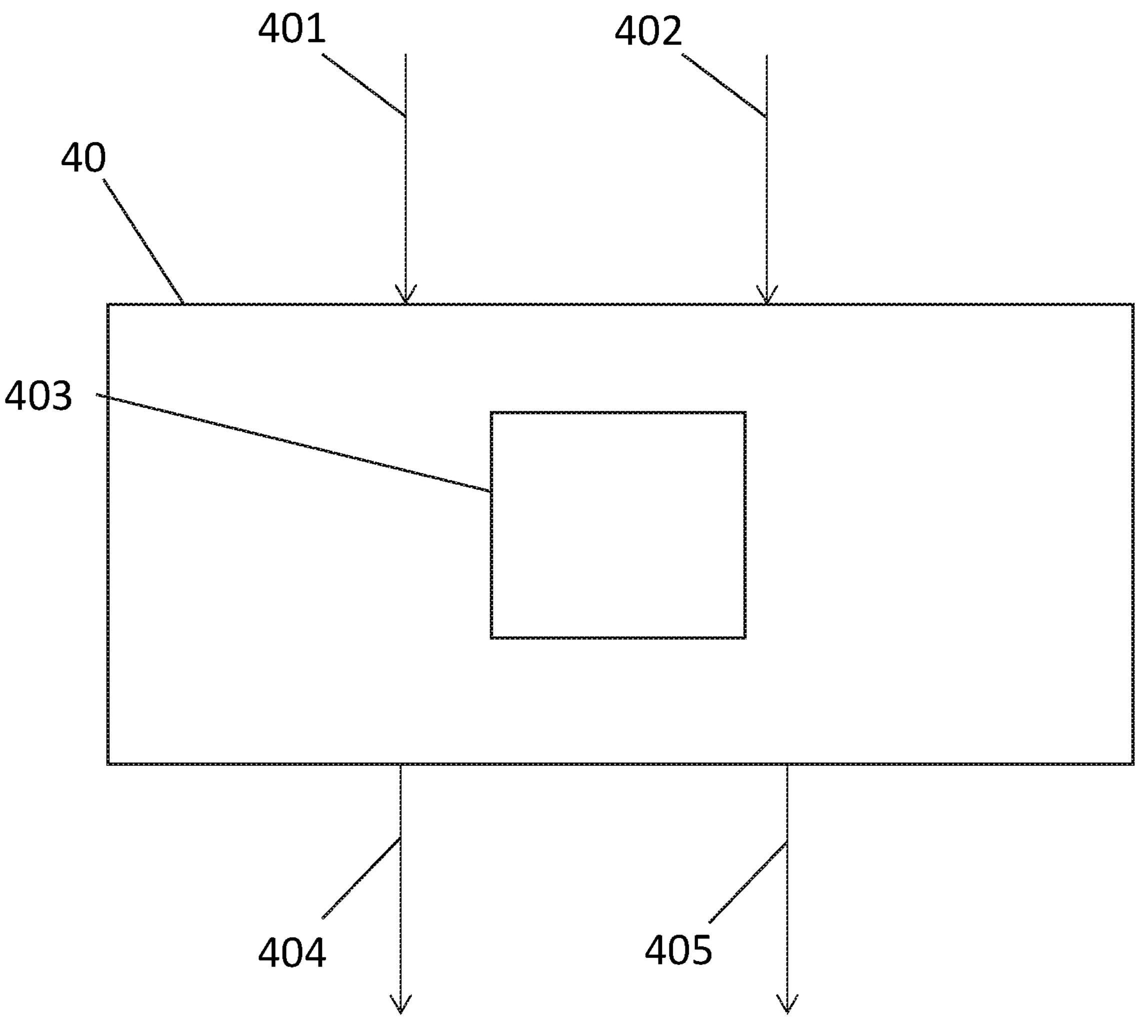
FIG. 4 schematically illustrates a controller of the wind turbine of FIG. 1 in accordance with an aspect of the invention; and, FIG. 5 shows the steps of a method performed by the controller of FIG. 4 in accordance with an aspect of the invention.

FIG. 4 schematically illustrates a controller 40 of the wind turbine 10 in accordance with an example of the invention. The controller 40 controls operation of the wind turbine 10 in a manner that maximises power production while limiting thrust loads experienced by the wind turbine rotor 104.

The controller 40 is configured to receive as input various data/signals, e.g. sensor data/signals, to be used to determine how to control operation of the wind turbine 10. In particular, the controller 40 is configured to receive a signal 401 including data indicative of wind speed in the vicinity of the wind turbine 10. The wind speed data may include sensor data, e.g. from one or more accelerometers, indicative of a measured wind speed in the vicinity of the wind turbine 10. Alternatively, the wind speed data may include an estimation of wind speed in the vicinity of the wind turbine 10, e.g. using a wind speed estimator module. In some examples, the controller 40 may determine the estimated wind speed. The controller 40 is also configured to retrieve the $C_t$ and $C_p$ data structures 20, 21, e.g. from a data memory (memory module) accessible by the controller 40. These data structures may be retrieved or received via the input 402. In some examples, the data memory may be regarded as being part of the controller/control system.

The controller 40 includes one or more processors (processing modules) 403 configured to use the received input signals to determine one or more control parameters for controlling operation of the wind turbine 10. In particular, the control parameters include a reference pitch angle for one or more of the rotor blades 106, and a rotor speed reference for a generator of the wind turbine 10.

The controller 40 is configured to output a pitch angle control signal 404 to one or more pitch actuators of the wind turbine 10 for actuating a pitch bearing of one or more of the rotor blades 106 to adjust the pitch angle of the rotor blade(s) 106. The controller 34 is also configured to output a generator speed control signal 405 to control the rotation speed of the wind turbine generator.

The described controller may be in the form of any suitable computing device, for instance one or more functional units or modules implemented on one or more computer processors. Such functional units may be provided by suitable software running on any suitable computing substrate using conventional or customer processors and memory. The one or more functional units may use a common computing substrate (for example, they may run on the same server) or separate substrates, or one or both may themselves be distributed between multiple computing devices. A computer memory may store instructions for performing the methods performed by the controller, and the processor(s) may execute the stored instructions to perform the method.

Figure 5:
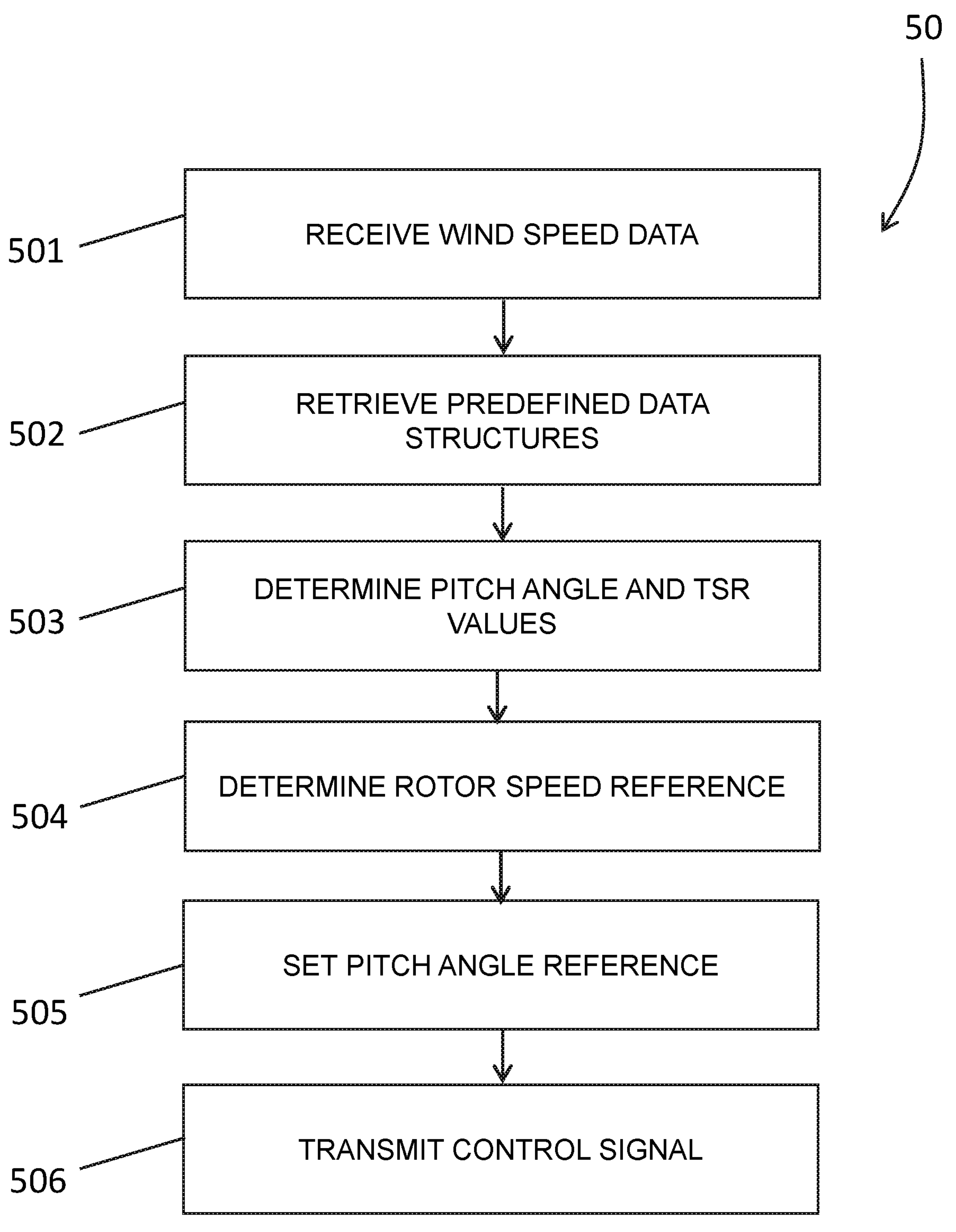

FIG. 5 summarises the steps of a method 50 performed by the wind turbine controller 40. At step 501, wind speed data indicative of (current) wind speed in the vicinity of the wind turbine 10 is received. As mentioned above, this can be in the form of a measured and/or estimated wind speed.

At step 502, a predefined power coefficient data structure comprising values of a power coefficient as a function of a pitch angle of the rotor blades and of a tip speed ratio of the wind turbine 10 is retrieved, e.g. from a data memory accessible by the controller 40. The predefined power coefficient data structure may be in the form of the $C_p$ data structure 21 in FIG. 2(*b*), i.e. a table or two-dimensional map. Also at step 502, a predefined thrust coefficient data structure comprising values of a thrust coefficient as a function of the pitch angle of the rotor blades and of the tip speed ratio of the wind turbine is retrieved, e.g. from a data memory accessible by the controller 40. Again, the predefined thrust coefficient data structure may be in the form of the $C_t$ data structure 20 in FIG. 2(*a*), i.e. a table or two-dimensional map.

At step 503 of the method 50, the controller 40 determines a value of the pitch angle and a value of the tip speed ratio that maximises the power coefficient value in the predefined power coefficient data structure subject to a defined set of constraints. The set of constraints at least includes a constraint that the thrust coefficient value in the predefined thrust coefficient data structure is no greater than a maximum threshold thrust coefficient value. This constraint may in one example be in the form of the constraints $C_t \leq C_{t,max}$ and $$C_{t,max} = F_{t,max} \Big/ \frac{\rho_{air}}{2} A_{rot} V^2$$

outlined above.

The maximum threshold thrust level may be a static or constant value, e.g. predefined. Alternatively, the maximum threshold thrust level may be dynamic, i.e. variable between for each solve of an optimisation problem to determine the optimised pitch angle and TSR values. In some examples in which a dynamic threshold is utilised, the threshold value may be determined based on a loading experienced by the rotor blades 106, which may be indicative of turbulence in the wind. In particular, the method 50 in this case may include receiving blade load data indicative of loading experienced by the rotor blades 106 from blade load sensors of the wind turbine 10. A statistical dispersion parameter—such as standard deviation, variation, etc.—indicative of temporal variation in the blade loading may be determined based on the received blade load data. The maximum threshold thrust level may then be determined based on the determined statistical dispersion parameter.

At step 503, the determination of the pitch angle and tip speed ratio values comprises applying an iterative search algorithm to the predefined power coefficient data structure to maximise the power coefficient value subject to the defined set of constraints. This may involve steps of defining an initial evaluation point with initial pitch angle and TSR values, determining a step size for each of the pitch angle and the TSR, determining an updated evaluation point with updated pitch angle and TSR values by shifting the initial values by the respective step sizes, and evaluating the power coefficient value at the updated evaluation point.

The iterative search algorithm may determine a difference between a maximum value of the power coefficient in the power coefficient data structure and the power coefficient value at the updated evaluation point. If the difference is less than a prescribed threshold difference value then the algorithm may stop. However, if the difference is greater than the threshold then a further iteration of the algorithm may be performed. In particular, this may involve determining a further step size and a further updated evaluation point, and then evaluating the power coefficient value at the further updated evaluation point. This iterative process may continue until a stop condition is satisfied, e.g. the determined difference is below the defined threshold value, or a prescribed maximum number of iterations have been performed.

The iterative search algorithm may be or include a gradient-based step method. In such cases, the step size for pitch angle may be determined based on a determined gradient of the thrust coefficient at the updated pitch angle value in the thrust coefficient data structure (or initial value for the first iteration). Also, the step size for TSR may be determined based on a determined gradient of the power coefficient at the updated TSR value in the thrust coefficient data structure (or initial value for the first iteration).

In some examples, the iterative search algorithm may be or include a one-step descent method. In such cases, the step size for pitch angle is determined as the difference between the pitch angle value that maximises the power coefficient value and the initial pitch angle value. Also, the step size for TSR is determined as the difference between the TSR value that maximises the power coefficient value and the TSR value.

At step 504 of the method 50, the controller 40 determines a rotor speed reference based on the determined TSR value. In particular, the rotor speed reference may be recovered/determined based on the TSR value and on the wind speed received at step 501. At step 505, the determined pitch angle value is used to determine a pitch angle reference, e.g. the pitch angle reference may be set equal to the determined pitch angle value.

At step 506, the wind turbine 10 is controlled in accordance with the rotor speed reference and the pitch angle reference to maximise power production while limiting thrust loading. For instance, the rotor blades 106 may be controlled in accordance with the pitch angle reference as part of a collective pitch setting. The wind turbine generator may be controlled in accordance with the rotor speed reference.

The method 50 may be repeated during operation of the wind turbine 10 at any suitable frequency. For instance, the method may be repeated at each time step of the controller 40 or at predefined intervals of time.

Many modifications may be made to the described examples without departing from the scope of the appended claims.

Although the described examples describe the use of data structures in the form of tables or maps to indicate thrust and power coefficient values each as functions of pitch angle and tip speed ratio, it will be understood that in different examples the relevant data may be stored in different types of data structures, e.g. a database or spreadsheet comprising thrust and/or power coefficient values for different combinations of pitch angle and tip speed ratio.

The invention claimed is:

1. A method of controlling a wind turbine having a rotor and a plurality of pitch-adjustable rotor blades mounted to the rotor, the method comprising:

retrieving a predefined power coefficient data structure comprising a plurality of power coefficient values, each power coefficient value corresponding to a respective combination of a pitch angle of the rotor blades and a tip speed ratio of the wind turbine;

retrieving a predefined thrust coefficient data structure comprising a plurality of thrust coefficient values, each thrust coefficient value corresponding to a respective combination of the pitch angle of the rotor blades and the tip speed ratio of the wind turbine;

determining, from the predefined power coefficient data structure, a combination of a value of the pitch angle and a value of the tip speed ratio at which the power coefficient value is maximized, subject to a thrust coefficient constraint that a thrust coefficient value of the predefined thrust coefficient data structure, corresponding to the combination of the value of the pitch angle and the value of the tip speed ratio, does not exceed a maximum threshold thrust coefficient value that is based on a current wind speed in the vicinity of the wind turbine; and controlling the wind turbine based on the determined combination of the value of the pitch angle and the value of the tip speed ratio, and on the current wind speed.

2. The method according to claim 1, further comprising:

receiving wind speed data indicative of the current wind speed, wherein controlling the wind turbine comprises:

determining a rotor speed reference based on the determined value of the tip speed ratio and on the current wind speed;

setting the determined pitch angle value as a pitch angle reference; and controlling the wind turbine in accordance with the rotor speed reference and the pitch angle reference, and wherein determining the combination of the value of the pitch angle and the value of the tip speed ratio comprises:

applying an iterative search algorithm to the predefined power coefficient data structure to maximize the power coefficient value subject to a set of one or more constraints including the thrust coefficient constraint.

3. The method according to claim 2, wherein applying the iterative search algorithm comprises:

defining an initial evaluation point comprising an initial pitch angle value and an initial tip speed ratio value;

determining a step size for each of the pitch angle and the tip speed ratio;

determining an updated evaluation point comprising updated pitch angle and tip speed ratio values by shifting the initial pitch angle and tip speed ratio values by the respective step sizes; and evaluating the power coefficient value at the updated evaluation point.

4. The method according to claim 3, wherein applying the iterative search algorithm comprises:

determining a difference between a maximum value of the power coefficient in the power coefficient data structure and the power coefficient value at the updated evaluation point; and when the determined difference is less than a prescribed threshold difference value, determining the updated pitch angle and tip speed ratio values as the pitch angle and tip speed ratio values that maximize the power coefficient value.

5. The method according to claim 4, wherein applying the iterative search algorithm further comprises:

when the determined difference is greater than the prescribed threshold difference value, determining a further step size for each of the pitch angle and the tip speed ratio;

determining a further updated evaluation point comprising further updated pitch angle and tip speed ratio values by shifting the updated pitch angle and tip speed ratio values by the respective further step sizes; and evaluating the power coefficient value at the further updated evaluation point.

6. The method according to claim 5, further comprising:

repeating, until a stop condition is satisfied, the steps of determining the further step size, determining the further updated evaluation point, and evaluating the power coefficient value, wherein the stop condition is one of the following:

a determined difference between a maximum value of the power coefficient in the power coefficient data structure and the power coefficient value at the further updated evaluation point is less than the prescribed threshold difference value; and the steps have been repeated a prescribed number of iterations.

7. The method according to claim 5, wherein the iterative search algorithm includes a gradient-based step method, wherein the step size for pitch angle is determined based on a determined gradient of the thrust coefficient at the updated pitch angle value in the thrust coefficient data structure, and wherein the step size for tip speed ratio is determined based on a determined gradient of the power coefficient at the updated tip speed ratio value in the thrust coefficient data structure.

8. The method according to claim 7, wherein the further updated evaluation point $x_{i+1}=[\theta_{i+1}, \lambda_{i+1}]$ is determined as:

$$x_{i+1} = x_i - \alpha(x_i)\frac{\nabla C_t(x_i)}{\|\nabla C_t(x_i)\|} \quad i = 0, \ldots, N-1$$

$$\alpha(x_i) = [\theta_{max} - \theta_i, \lambda_{max} - \lambda_i]$$

where $x_i=[\theta_i, \lambda_i]$ is the updated evaluation point, $\theta_i$ is the updated pitch angle value, $\lambda_i$ is the further tip speed ratio value, $\theta_{i+1}$ is the further updated pitch angle value, $\lambda_{i+1}$ is the further updated tip speed ratio value, $(\theta_{max}, \lambda_{max})$ is the pair of pitch angle and tip speed ratio values that maximises the power coefficient in the power coefficient data structure, N is the prescribed number of iterations, and $\nabla C_t(x_i)$ is the gradient of the thrust coefficient at the updated evaluation point.

9. The method according to claim 3, wherein the initial pitch angle value is based on a current pitch angle of the rotor blades of the wind turbine, and wherein the initial tip speed ratio value is based on the current wind speed and on a current rotor speed of the rotor.

10. The method according to claim 2, wherein the iterative search algorithm includes a one-step descent method, wherein the step size for pitch angle is determined as the difference between the pitch angle value that maximizes the power coefficient value and the initial pitch angle value, and wherein the step size for tip speed ratio is determined as the difference between the tip speed ratio value that maximizes the power coefficient value and the initial tip speed ratio value.

11. The method according to claim 2, wherein the set of one or more constraints further includes a constraint that the maximum threshold thrust coefficient value $C_{t,max}$ satisfies:

$$C_{t,max} = F_{t,max} \Big/ \frac{\rho_{air}}{2} A_{rot} V^2$$

where $F_{t,max}$ is a maximum allowable rotor thrust, $A_{rot}$ is a swept area of the rotor blades of the wind turbine, $\rho_{air}$ is air density, and V is the wind speed.

12. The method according to claim 2, wherein the set of one or more constraints further includes a constraint that a generator speed of a generator of the wind turbine does not exceed a maximum threshold generator speed value, the maximum threshold generator speed value being determined based on the received wind speed data.

13. The method according to claim 2, wherein the set of one or more constraints further includes a constraint that the determined pitch angle and tip speed ratio values do not cause one or both of: a stall condition of the wind turbine; and instability of the rotor blades of the wind turbine.

14. The method according to claim 1, further comprising:

determining the thrust coefficient constraint by reducing a feasible solution space of the power coefficient data structure for the iterative search algorithm to remove combinations of pitch angle and tip speed ratio values corresponding to values of the thrust coefficient greater than the maximum threshold thrust coefficient value in the thrust coefficient data structure.

15. The method according to claim 1, further comprising:

receiving blade load data indicative of loading experienced by the rotor blades from one or more blade load sensors of the wind turbine;

determining, based on the received blade load data, a statistical dispersion parameter indicative of temporal variation in the blade loading; and defining the maximum threshold thrust coefficient value based on the determined statistical dispersion parameter.

16. A controller for a wind turbine having a rotor and a plurality of pitch-adjustable rotor blades mounted to the rotor, the controller comprising one or more processors configured to:

retrieve a predefined power coefficient data structure comprising a plurality of power coefficient values, each power coefficient value corresponding to a respective combination of a pitch angle of the rotor blades and a tip speed ratio of the wind turbine;

retrieve a predefined thrust coefficient data structure comprising a plurality of thrust coefficient values, each thrust coefficient value corresponding to a respective combination of the pitch angle of the rotor blades and the tip speed ratio of the wind turbine;

determine, from the predefined power coefficient data structure, a combination of a value of the pitch angle and a value of the tip speed ratio at which the power coefficient value is maximized, subject to a thrust coefficient constraint that a thrust coefficient value of the predefined thrust coefficient data structure, corresponding to the combination of the value of the pitch angle and the value of the tip speed ratio, does not exceed a maximum threshold thrust coefficient value that is based on a current wind speed in the vicinity of the wind turbine; and control the wind turbine based on the determined combination of the value of the pitch angle and the value of the tip speed ratio, and on the current wind speed.

17. A wind turbine comprising the controller according to claim 16.

18. The controller according to claim 16, wherein the one or more processors are further configured to:

receive wind speed data indicative of the current wind speed, wherein controlling the wind turbine comprises:

determining a rotor speed reference based on the determined value of the tip speed ratio and on the current wind speed;

setting the determined pitch angle value as a pitch angle reference; and controlling the wind turbine in accordance with the rotor speed reference and the pitch angle reference, and wherein determining the combination of the value of the pitch angle and the value of the tip speed ratio comprises:

applying an iterative search algorithm to the predefined power coefficient data structure to maximize the power coefficient value subject to a set of one or more constraints including the thrust coefficient constraint.

19. A wind turbine, comprising:

a tower;

a nacelle disposed on the tower;

a rotor extending from the nacelle and having a plurality of pitch-adjustable rotor blades disposed on a distal end thereof; and a controller configured to:

retrieve a predefined power coefficient data structure comprising a plurality of power coefficient values, each power coefficient value corresponding to a respective combination of a pitch angle of the rotor blades and a tip speed ratio of the wind turbine;

retrieve a predefined thrust coefficient data structure comprising a plurality of thrust coefficient values, each thrust coefficient value corresponding to a respective combination of the pitch angle of the rotor blades and the tip speed ratio of the wind turbine;

determine, from the predefined power coefficient data structure, a combination of a value of the pitch angle and a value of the tip speed ratio at which the power coefficient value is maximized, subject to a thrust coefficient constraint that a thrust coefficient value of the predefined thrust coefficient data structure, corresponding to the combination of the value of the pitch angle and the value of the tip speed ratio, does not exceed a maximum threshold thrust coefficient value that is based on a current wind speed in the vicinity of the wind turbine; and control the wind turbine based on the determined combination of the value of the pitch angle and the value of the tip speed ratio, and on the current wind speed.

20. The wind turbine according to claim 19, wherein the controller is further configured to:

receive wind speed data indicative of the current wind speed, wherein controlling the wind turbine comprises:

determining a rotor speed reference based on the determined value of the tip speed ratio and on the current wind speed;

setting the determined pitch angle value as a pitch angle reference; and controlling the wind turbine in accordance with the rotor speed reference and the pitch angle reference, and wherein determining the combination of the value of the pitch angle and the value of the tip speed ratio comprises:

applying an iterative search algorithm to the predefined power coefficient data structure to maximize the power coefficient value subject to a set of one or more constraints including the thrust coefficient constraint.

* * * * *